United States Patent [19]

Wolfe, Jr.

[11] 4,183,836

[45] Jan. 15, 1980

[54] AQUEOUS POLYURETHANE DISPERSIONS

[75] Inventor: Harry W. Wolfe, Jr., Newark, Del.

[73] Assignee: E. I. Du Pont de Nemours and Company, Wilmington, Del.

[21] Appl. No.: 875,620

[22] Filed: Feb. 6, 1978

[51] Int. Cl.$^2$ .......................... C08J 3/02; C08L 75/04
[52] U.S. Cl. ...................... 260/29.2 TN; 260/29.2 N; 528/61; 528/65
[58] Field of Search .................. 260/29.2 TN, 29.2 N, 260/29.2 EP; 528/61, 65

[56] References Cited

U.S. PATENT DOCUMENTS

| | | | |
|---|---|---|---|
| 3,412,054 | 11/1968 | Milligan et al. | 260/18 |
| 3,988,278 | 10/1976 | Bartizal | 260/29.2 TN |
| 3,997,491 | 12/1976 | Matsuda et al. | 260/29.2 TN |

*Primary Examiner*—Allan Lieberman

[57] ABSTRACT

A water-based polyurethane dispersion is prepared by mixing an aliphatic diisocyanate with three critical active hydrogen compounds, to form a prepolymer containing carboxyl groups and free isocyanate groups, then dispersing the prepolymer in an aqueous medium containing a tertiary amine, which converts the carboxyl groups to carboxylate ions, and a diamine, which chain-extends the prepolymer through its —NCO groups. These aqueous dispersions are storage-stable for at least several months and are useful in many coating applications, among others, for coating textile materials.

7 Claims, No Drawings

AQUEOUS POLYURETHANE DISPERSIONS

BACKGROUND OF THE INVENTION

This invention relates to an aqueous polyurethane dispersion particularly suitable as a coating composition. The dispersion is also useful in adhesive applications.

Polyurethane coating compositions are important commercial products. They provide a tough, flexible, abrasion-resistant finish for a variety of industrial articles made of wood, metal, glass, ceramic materials, and fabrics. Because of the difficulty of dispersing polyurethanes in water, the usual commercial polyurethane compositions are solutions or dispersions in organic solvents. However, these solvent-based products have several shortcomings, especially high cost, high flammability, and toxicity of solvent vapors. There is, therefore, a great need for polyurethane coating compositions based on water dispersions.

SUMMARY OF THE INVENTION

According to the present invention, there is now provided a composition obtained by mixing
an isocyanate-terminated, carboxyl group-containing prepolymer made by reaction of (A) 1 equivalent of an aliphatic diisocyanate with (B) total 0.6–0.8 equivalent of the following active hydrogen compounds;

(a) $\alpha,\alpha$-dimethylolacetic acid or a homologue thereof, (b) a polymeric glycol selected from poly(alkyleneoxy) glycols and polyester glycols having a weight average molecular weight of about 400–3000, and (c) N,N'-dicyanoethylpoly(propyleneoxy)diamine having a number average molecular weight of about 200–2000;

the amount of component (a) being about 0.08–0.25 hydroxyl equivalent per 100 g of total weight of all the reactants A and B, and the relative mole proportions of compounds (b) and (c) being about 30:70 to 70:30, with an aqueous solution of a sufficient amount of a tertiary amine to convert substantially all the carboxyl groups of the prepolymer to carboxylate ions, then chain-extending the prepolymer with about stoichiometric amount, based on free isocyanate groups, of a diamine having at least one hydrogen attached to each nitrogen atom.

DETAILED DESCRIPTION OF THE INVENTION

Aliphatic diisocyanates suitable in the process of the present invention include, among others, hexamethylene diisocyanate, 1-isocyanato-2-isocyanatomethyl-3,5,5-trimethylcyclohexane and methylenebis(cyclohexyl isocyanate), which is preferred.

It is recommended to add the acid (a) after the reaction of the diamine (c) with the diisocyanate A is complete, to avoid premature salt formation. With this reservation, the reactants can be added in any order. Yet, it is preferred to run this reaction in steps, allowing the diisocyanate to react first with N,N'-dicyanoethylpoly(propyleneoxy) diamine. The resulting polyurea catalyzes the subsequent reactions of the less reactive hydroxyl groups with additional isocyanate groups. Other catalysts, e.g., organotin compounds or tertiary amines can also be present in the reaction medium. This reaction is carried out in a manner well known to the art, either in the absence of diluent or in an inert, nonaqueous solvent, which may be removed at the end of reaction in a conventional manner, e.g., by evaporation.

Homologues of $\alpha,\alpha$-dimethylolacetic acid suitable in the process of the present invention must also be $\alpha,\alpha$-dimethylolcarboxylic acids. Under the conditions of the reaction, their hydroxyl groups react preferentially with isocyanate groups; carboxyl groups do not react. Representative $\alpha,\alpha$-dimethylolcarboxylic acids include $\alpha,\alpha$-dimethylolpropionic acid and $\alpha,\alpha$-dimethylolbutyric acid, the former being preferred because of its ready commercial availability.

Suitable polymeric glycols include poly(alkyleneoxy) glycols which are commercially available from several sources under such trade names as, for example, Varanol ®, Niax ®, and Pluronic ®. Poly(propyleneoxy) glycol is preferred. Polyester glycols, including poly($\epsilon$-caprolactone) glycol and polycarbamate glycols, can also be used. Poly(ethylene adipate) glycol is preferred and available under trade names such as Rucoflex ® and Multron ®.

The prepolymer is dispersed in an aqueous solution of tertiary amine. The tertiary amine must not carry any substituents reactive with isocyanate groups. Otherwise, there are no restrictions on its molecular weight or substituent groups. The lower molecular weight aliphatic tertiary amines, such as triethylamine, tripropylamine, or tributylamine, are preferred because they present less potential health hazard than aromatic amines, are stronger bases capable of readily forming salts with carboxyl groups, and have sufficient volatility for the practical operation of the process of the present invention. This step of dispersing the prepolymer in the presence of tertiary amine is carried out at ambient temperature to avoid hydrolyzing the isocyanate groups of the prepolymer. The dispersion is stable at room temperature for several hours.

The prepolymer can be diluted with a small amount of an organic, water-miscible solvent, for example, methyl ethyl ketone, to help achieve good dispersion.

The chain-extending diamine is then added at ambient temperature, and the resulting mixture is well agitated. The diamines can be any diprimary, disecondary, or primary-secondary diamine. Examples of suitable diamines include ethylenediamine and higher alkylenediamines, 2,5-diazahexane and its higher homologues, especially those having longer alkylene chains, and N-methylethylenediamine and its higher homologues, especially those having longer alkylene chains. These aqueous dispersions of chain-extended polyurethane prepolymer are storage-stable. At room temperature, they can be stored for several months without undesirable changes taking place. These dispersions do not appear to the naked eye to contain discrete particles but rather look like cloudy or colloidal solutions. Their appearance depends to some extent on their ionic concentrations.

This invention is now illustrated by the following examples of certain representative embodiments thereof, wherein all parts, proportions and percentages are by weight, unless otherwise indicated.

Test Methods

The following test methods are employed in the following examples:

Sward Hardness—This method is described in "Physical and Chemical Examination of Paints, Varnishes, Lacquers, Colors", Gardner and Sward, 11th ed., 1950, pages 164–166.
Modulus at 100% Elongation, $M_{100}$: ASTM D412
Tensile Strength at Break, $T_B$: ASTM D412
Elongation at Break, $E_B$: ASTM D412

EXAMPLE 1

To a mixture of 132 g (1.0 equivalent) of 4,4'-methylenebis(cyclohexyl isocyanate) containing 65% cis-trans isomer, 20% trans-trans isomer and 15% cis-cis isomer, 0.05 g of dibutyltin dilaurate, and 74 g of methyl ethyl ketone is added with mixing 42 g (0.25 equivalent) of N,N'-di-β-cyanoethylpoly(propyleneoxy)diamine having a molecular weight of about 236. After 15 minutes, 100 g (0.2 equivalent) of poly(propyleneoxy)glycol having a molecular weight of about 1000 is added with mixing. The mixture is heated to 80° C. and maintained at that temperature for 2 hours, after which 20.1 g (0.3 equivalent) of α,α-dimethylolpropionic acid is added, and heating at 80° C. is continued for another hour. The resulting prepolymer is cooled to room temperature and held for at least 24 hours.

To an agitated mixture of 1.9 g of triethylamine and 70 g of water at 25° C. is added 50 g of the above prepolymer. Agitation is continued for 15 minutes to insure complete dispersion. To this dispersion is added 1.2 g of ethylenediamine, and agitation is continued for 30 minutes. The resulting dispersion is quite stable and can be stored for an extended period. The dispersion is an opalescent liquid having the following properties:
Viscosity, Pa·s at 22° C.: 0.40
Solids Content, %: 32
pH: 7.6
Density g/ml: 1.01

Draw films of 0.254 mm wet thickness are formed on plate glass. The film dries to a thickness of about 0.0762 mm in 35–45 minutes at 25° C. The clear dry film is removed from the glass plate for physical testing. The following properties are obtained:
Sward Hardness: 30
$T_B$, MPa: 23.1
$E_B$, %: 230
$M_{100}$, MPa: 16.1

EXAMPLE 2

Substantially identical results are obtained when Example 1 is repeated using 100 g of poly(ethylene adipate) glycol having a molecular weight of about 1000 in place of 100 g of poly(propyleneoxy) glycol of 1000 molecular weight.

EXAMPLES 3–7

A series of prepolymers are prepared by the procedure of Example 1 employing the following ingredients in the amounts tabulated below.

|  | Examples |  |  |  |  |
|---|---|---|---|---|---|
|  | 3 | 4 | 5 | 6 | 7 |
| 4,4'-methylenebis(cyclohexyl isocyanate), equivalents | 1.0 | 1.0 | 1.0 | 1.0 | 1.0 |
| N,N'-di-β-cyanoethylpoly-(propyleneoxy) diamine, MW 340, equivalents | 0.25 | 0.15 | 0.1 | 0.1 | — |
| N,N'-di-β-cyanoethylpoly-(propyleneoxy)diamine, MW 2000, equivalents | — | — | — | 0.075 | 0.1 |
| poly(propyleneoxy) glycol, MW 1000, equivalents | 0.2 | 0.2 | 0.2 | — | — |
| poly(propyleneoxy) glycol, MW 2000, equivalents | — | — | — | 0.075 | 0.1 |
| α,α-dimethylolpropionic acid, equivalents | 0.3 | 0.4 | 0.4 | 0.45 | 0.5 |

Portions of each of the resulting prepolymers are converted to dispersions employing the procedure and amounts used in Example 1. Clear films are prepared from each formulation and have the following properties:

|  | Examples |  |  |  |  |
|---|---|---|---|---|---|
|  | 3 | 4 | 5 | 6 | 7 |
| Sward Hardness | 30 | 38 | 22 | 18 | 4 |
| $M_{100}$, MPa | 16.9 | 14.7 | 13.5 | 15.6 | 9.7 |
| $T_B$, MPa | 26.3 | 21.9 | 16.3 | 22.5 | 19.4 |
| $E_B$, % | 250 | 240 | 180 | 316 | 430 |

EXAMPLES 8–11

A series of four prepolymers are prepared in which the concentration of carboxyl groups is varied in order to demonstrate the effect of ionic concentration on ease of dispersion and film clarity. The amounts of reactants used to prepare the prepolymers are tabulated below. The prepolymers are formed substantially by the procedure of Example 1.

|  | Examples |  |  |  |
|---|---|---|---|---|
|  | 8 | 9 | 10 | 11 |
| 4,4'-methylenebis(cyclohexyl isocyanate), equivalents | 1.0 | 1.0 | 1.0 | 1.0 |
| N,N'-di-β-cyanoethylpoly-(propyleneoxy)diamine, MW 340, equivalents | 0.2 | 0.2 | — | — |
| N,N'-di-β-cyanoethylpoly-(propyleneoxy)diamine, MW 2000, equivalents | — | — | 0.2 | 0.2 |
| poly(propyleneoxy) glycol, MW 1000, equivalents | 0.2 | — | 0.2 | — |
| poly(propyleneoxy) glycol, MW 2000, equivalents | — | 0.2 | — | 0.2 |
| α,α-dimethylolpropionic acid, equivalents | 0.35 | 0.35 | 0.35 | 0.35 |
| α,α-dimethylpropionic acid, % by weight | 8.1 | 6.1 | 5.2 | 4.2 |

Portions of each of the resulting prepolymers are converted to dispersions employing the procedure and amounts used in Example 1. Films are prepared from the resulting dispersions. Dispersions 8 and 9 are readily formed and are stable on storage. Dispersions 8 and 9 form clear films. In contrast, dispersions 10 and 11 are not stable on storage and form films which are opaque.

I claim:
1. A composition obtained by mixing an isocyanate-terminated, carboxyl group-containing prepolymer made by reaction of (A) 1 equivalent of an aliphatic diisocyanate with (B) total 0.6–0.8 equivalent of the following active hydrogen compounds:
 (a) α,α-dimethylolacetic acid or a homologue thereof,
 (b) a polymeric glycol selected from poly(alkyleneoxy) glycols and polyester glycols having a weight average molecular weight of about 400–3000, and

(c) N,N'-dicyanoethylpoly(propyleneoxy)diamine having a number average molecular weight of about 200–2000;

the amount of component (a) being about 0.08–0.25 hydroxyl equivalent per 100 g of total weight of all the reactants A and B, and the relative mole proportions of compounds (b) and (c) being about 30:70 to 70:30, with an aqueous solution of a sufficient amount of a tertiary amine free of substituents reactive with isocyanate groups to convert substantially all the carboxyl groups of the prepolymer to carboxylate ions, then chain-extending the prepolymer with about stoichiometric amount, based on free isocyanate groups, of a diamine having at least one hydrogen attached to each nitrogen atom.

2. A composition of claim 1 wherein the diisocyanate is methylenebis(cyclohexyl isocyanate).

3. A composition of claim 1 wherein α,α-dimethylolpropionic acid is employed as the active hydrogen compound (a).

4. A composition of claim 1, which contains a small amount of a water-miscible organic solvent.

5. A composition of claim 4, wherein the solvent is methyl ethyl ketone.

6. A composition of claim 1 wherein the tertiary amine is triethylamine.

7. A composition of claim 6 wherein the diamine is ethylenediamine.

* * * * *